April 8, 1952     S. GARFIELD     2,592,413
STEERING DEVICE FOR STEERING WHEELS
Filed May 1, 1947
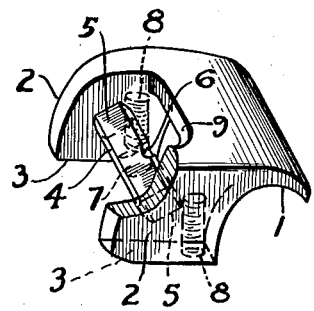
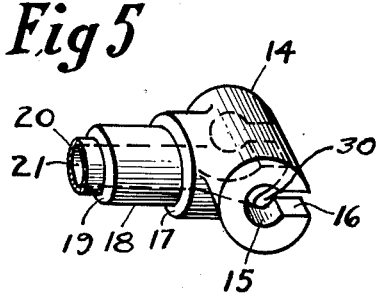
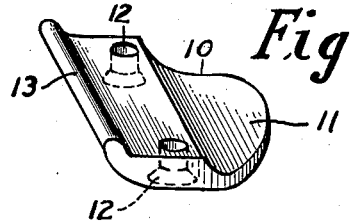
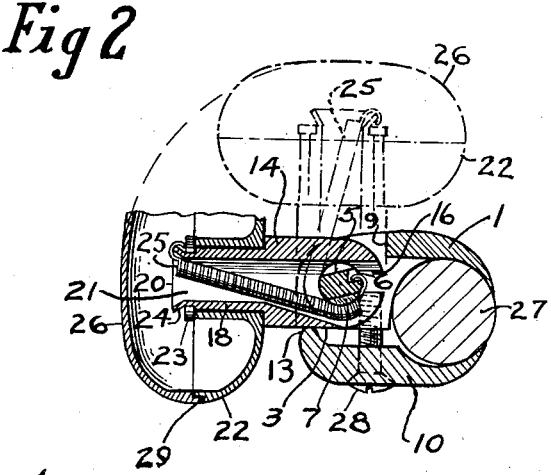
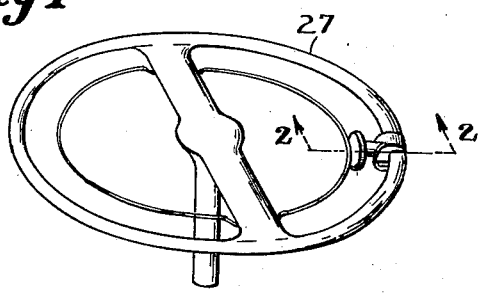
INVENTOR.
SYDNEY GARFIELD
BY George H. Corey
His Attorney Patented Apr. 8, 1952

2,592,413

UNITED STATES PATENT OFFICE 2,592,413

STEERING DEVICE FOR STEERING WHEELS

Sydney Garfield, Los Angeles, Calif.

Application May 1, 1947, Serial No. 745,353

9 Claims. (Cl. 74—557)

1

This invention relates to steering devices and more especially to steering wheels which are used in automobiles, power boats and other steerable vehicles. The invention particularly relates to a device for attachment to a steering wheel to aid the hand to secure a firm grip upon the wheel for moving the wheel through large angles of movement, as in making a sharp turn in an automobile.

Various devices have been proposed heretofore for attachment to a steering wheel or for incorporation in the structure of a wheel to aid the hand in gripping the wheel for movements thereof greater than those necessary for ordinary steering of the vehicle in a more or less straight course. In some of these attachments or structures the rim of the wheel has been utilized for attachment of the device or the device otherwise has been located adjacent the rim. Such devices may interfere with the free movement of the hand along the rim, as for example when the wheel is permitted to slip through the hand as it revolves under the caster action of the front wheels of an automobile. Although affording a means for firmly gripping the wheel to produce a direct pull thereon, some of these devices are inconvenient since they do not accommodate for the change in relation of the hand to the wheel as the wheel is turned, especially when turned through a large angle. To avoid this difficulty in certain devices a knob is provided which is capable of turning on its axis relative to the wheel, but usually the device is mounted on the wheel or on the rim of the wheel in such a way as to interfere with the easy manipulation of the wheel in the ordinary operation of steering when the rim itself is gripped by the hand. For greater convenience in certain of the devices it therefore has been proposed that the knob or handle to be gripped by the hand be arranged in hinged relation to the means providing attachment to the wheel so that this knob or handle may be swung by the hand out of the position in which it is used when gripped by the hand to rotate the wheel into a retracted position in which it is more or less clear of the hand in the normal operation of the wheel. In such devices, however, it has been necessary to move the knob or handle both into the operating position and from the operating position to the retracted position, no automatic means having been provided for this purpose.

It is an object of the invention to provide a device adapted to be carried by or for attachment to a steering wheel in which a member which may be grasped by the hand is automatically moved from the operating position to a retracted position when released.

It is another object of the invention to provide a member adapted to be grasped by the hand which may be so grasped that with a natural movement of the hand it can be readily moved into the operating position from the retracted position.

It is a further object of the invention to provide in such a device means for readily attaching the device to a part of the wheel in such a way that, upon retraction of the member adapted to be grasped by the hand, the wheel will be substantially free of encumbering parts which interfere with the grip by the hand for normal operation of the wheel.

It is an additional object of the invention to provide in such a device for easily mounting the movable member on and demounting it from its supporting means as well as for readily attaching the device on and detaching it from the wheel.

It is a feature of the invention that means are provided which may be constructed as part of the wheel or may serve for attaching the device to the wheel, which means supports a member adapted to be grasped by the hand or by the fingers thereof so that this member may be moved to different positions with respect to the wheel, bias means being provided which is connected to the member and to the means for supporting the member for effecting movement of the member in a given direction with respect to the wheel. In a convenient adaptation of the invention to a steering wheel a clamping means may be provided for clamping engagement with a part of the wheel, preferably with the rim of the wheel. The member movable to different positions may include a knob adapted to be grasped by the hand for effecting steering movement of the wheel, this member preferably being supported on the clamping means for pivotal movement thereof on an axis which is parallel to the plane of the wheel when the device is attached to the wheel. In the preferred embodiment the knob is carried by the pivotally supported member for rotational movement of the knob on said member. The knob may be moved from the retracted position to the operating position by a finger or fingers of the hand with an easy movement of the wrist to effect pivotal movement of the member carrying the knob and then may be grasped for the steering operation.

The bias means utilized may be any suitable means for yieldingly resisting the movement of the knob and its supporting member from the retracted to the operating position and for restoring the knob and member to the retracted position. In the preferred embodiment of the invention this bias means comprises a spring extending within a cavity in the pivoted knob supporting member, this spring engaging this pivoted member and the attaching means or the clamp so as to effect return movement of this pivoted member and the knob carried thereby to the retracted position from the operating position when the knob is released from the hand. When the knob is grasped by the hand the pivotal movement thereof is effected against the bias of this spring.

The device is provided with means for limiting the movement of the pivoted member in both directions so that in the retracted position the hand will find the knob always in a given relation to the wheel and in the operating position the action will take place substantially as if the pivoted member were rigidly attached to the wheel in this operating position. The attaching or clamping means may be so constructed and the knob carrying member may be so formed with respect thereto that the member may be mounted or removed from the clamping means while providing for the requisite pivotal movement and for retaining the member in this pivotal relation to the attaching means or clamp in the various positions to which normally it may be moved. The construction is such, however, that when the member is moved to a particular position it may be removed from the clamp, preferably by a movement thereof transversely of the pivotal axis.

The invention will be further understood from the following description taken in connection with the drawings in which:

Fig. 1 shows the device of the invention mounted on the rim of the steering wheel.

Fig. 2 shows a section taken on line 2—2 in Fig. 1.

Fig. 3 shows a perspective view of one of the pieces for clamping the device to the rim of the steering wheel.

Fig. 4 shows a perspective view of the cooperating clamping piece.

Fig. 5 shows a perspective view of the member adapted to be pivotally supported by the clamping means.

As shown in Fig. 1 the device of the invention in the embodiment about to be described is mounted on the rim 27 of the steering wheel. To effect this attachment the device in this embodiment provides a clamping piece 1 having a jaw providing a curved surface adapted to fit to the curved surface of the rim 27 of the steering wheel. A cooperating clamping piece 10, as shown in Fig. 4, is provided with a corresponding surface 11 adapted to fit to the opposite side of the surface of the rim 27. Clamping piece 1 in this embodiment is formed with two wing walls 2 extending transversely of the clamping portion of this piece. Preferably the clamp will be mounted on the rim 27 with these wing walls 22 extending toward the pivotal axis of the wheel.

The cooperating clamping piece 10 is provided with a toe 13 adapted to cooperate with the lower faces 3 of the wings 2, as shown in Fig. 2, these wings being in spaced relation to each other in the direction generally parallel to the wall of the clamping portion of the piece 1. The wing walls 2 are tapped as shown at 8, Fig. 3, to receive screws 28 adapted to pass through the holes 12 in the cooperating clamping piece 10 to effect the clamping action on the rim 27 between the clamping piece 1 and the clamping piece 10. There is thus provided a support adapted to be rigidly attached to the steering wheel and of such form as to cause substantially no interference with the hand as it grips the rim 27 in the normal operation of the steering wheel.

As shown in Figs. 2 and 3, the clamping piece 1 supports a shaft 4 extending between the wing walls 2 in a direction generally parallel to the wall of the clamping portion of the piece 1, that is, parallel to the arc of the rim 27, and parallel to the plane of the wheel. The shaft 4 may be formed integral with the wing walls 2 or may be formed as a separate piece passing through and supported by these walls. This shaft is formed with opposite sides 5 thereof flat and parallel but is otherwise of cylindrical section as shown in Fig. 2 and is adapted to carry the member 14 shown in Fig. 5 for pivotal movement of this member on the shaft 4. To this end the hub of the pivotally supported member 14 is provided with a bore 15 fitting to the cylindrical surfaces of the shaft 4 so as to provide for swinging movement clockwise and counterclockwise in Fig. 2 of the member 14 on the axis of the shaft 4.

The hub of the member 14, as shown in Fig. 5, is provided also with a slot 16 parallel to the bore 15 and extending outwardly thereof from the bore 15. The width of the slot 16 corresponds to the thickness of the shaft 4 between the faces 5 thereof to permit passage of the shaft through the slot into the bore 15 to position the member 14 with the axis of the bore 15 thereof concentric with the axis of the shaft 4. It will be apparent from Fig. 2 that the mounting of the pivotally supported member 14 may be accomplished when the clamping piece 10 is loosened from the clamping piece 1 to permit the member 14 to swing downwardly sufficiently to bring the walls of the slot 16 into positions substantially in line with the flat surfaces 5 of the shaft 4. The pivoted member 14, upon reaching the position in which the bore 15 is concentric with shaft 4, may be swung upwardly, the cylindrical surface of the bore 15 moving over the cylindrical surface of shaft 4. The clamping piece 10 then may be fastened in place by tightening the screws 28. When thus fastened the toe 13 will be in position to take the bearing of the under side of the pivoted member 14, as shown in Fig. 2, to prevent downward movement of the member 14 to the position where the walls of the slot 16 are aligned with the flat surfaces 5 on the shaft. The member 14 thus is held against removal from the shaft until the clamping member 10 again is loosened. It will be apparent that the hub of the pivoted member 14 may be of such length along the shaft 4 as to fit between the inner surfaces of the wing walls 2 of the clamping member 1 so as to prevent endwise movement of the member 14 along the shaft 4.

The pivoted member 14 is provided with a shank 18 of reduced diameter with respect to a hub 17 thereof which extends laterally from the main shaft receiving hub of this member. The shank 18 in the particular embodiment shown is turned to a size to receive the bore of a knob of suitable form to be gripped by the hand. In this embodiment the knob is constructed in two parts, the part 22 thereof providing an inturned hub which is bored to fit the shank 18 of the pivotal member 14 so as to provide for rotation of the knob on this shank upon an axis which is transverse to the axis of the shaft 4. The knob is also provided with a cover part 26 which fits to the part 22 in shouldered relation, as shown at 29 in Fig. 2. This fit may be a driving or a spring fit or if desired the parts 22 and 26 in these portions may be provided with threads and one screwed upon the other to provide for removal of the part 26 from the part 22 in order to obtain access to the means for retaining the knob in place on the pivotal member 14 as well as for access to the bias means about to be described for restoring the device of the invention to the retracted position.

As shown in Figs. 2 and 5 the outer end of the pivotal member 14 beyond the shank 18 is provided with a portion 20 of reduced diameter forming a shoulder 19 with the shank 18 upon which a washer 23 may be placed to bear against the end of the shank 18 and to provide means for preventing endwise movement of part 22 of the knob while also permitting rotation of the knob on the shank 18. To retain the washer 23 in place the outer end of portion 20 of the pivotal member 14 may be flared as by a riveting tool as shown at 24 in Fig. 2, the portion 20 extending sufficiently beyond the washer 23 for this purpose.

The pivotal member 14 also is provided with an elongated cavity 21 extending from the outer left hand end in Figs. 2 and 5 to communicate with the bore 15 of the member 14. As shown in Fig. 5 this cavity may be continued toward the right in the form of a slot 30 extending transversely of the bore 15 to the exterior surface of the main hub of the member 14. Within the cavity 21 and the slot 30 in the particular embodiment shown in the drawing an helical spring 25 is positioned, the outer end of this spring being hooked upon the flared extension 24 of the pivotal member 14. The inner end of the spring is wrapped circumferentially about the shaft 4, as shown in Fig. 2, the hook at this end of the spring engaging a notch 6 in the shaft 4. The length of the spring is such relative to the distance between the flared portion 24 and the notch 6 when the pivotal member 14 is in the position shown in Fig. 2, that is, bearing against the toe 13, that the spring 25 is under sufficient tension to retain the member 14 in this position and the knob therefore is in the retracted position as shown in Fig. 1 relative to the rim 27.

It will be apparent from a consideration of Figs. 1 and 2 that with a finger or fingers of the hand the knob and the member 14 pivotally supported on the shaft 4 may be moved in the clockwise direction in Fig. 2 to the upright dotted line position shown in this figure by a turning movement of the wrist. It also will be observed that in such movement the spring 25 becomes stretched around the periphery of the shaft 4 and that, therefore, the tension of the spring 25 is increased. A means is thus provided by virtue of which the member 14 and the knob carried thereby are biased to return to the retracted position when released from the hand. It also will be apparent, as the knob is mounted on the pivotal member 14 for rotation thereof about an axis transverse to the axis of the shaft 4, that movement of the right hand portion of the wheel in Fig. 1 easily may be effected away from or toward the body of the operator by the right hand grasping the knob in the position shown in dotted lines in Fig. 2. A strong pull or push by the hand may be exerted without the necessity of accommodating the hand or the fingers thereof to the changes of position of surfaces which initially are grasped by the hand as is the case in certain devices of the prior art which change their relation to the hand as the wheel is rotated about its axis. As soon, however, as the knob is released by the hand the spring 25 immediately returns the member 14 and the knob to the retracted position in which it is out of the way of the hand in the normal function thereof in grasping the rim of the wheel in steering.

In order to secure the conformance of the spring to the periphery of the shaft 4 in all of the positions of the member 14 between the operating position as shown in dotted lines and the retracted position as shown in full lines in Fig. 2, thus making the line of action of the effective straight portion of the spring tangential to a circle about the axis of the shaft 4, this shaft is provided with a portion 7 at the lower side thereof which divides the lower flat surface 5 into two parts as shown in Fig. 3. The portion 7 is of a cylindrical form continuous with the cylindrical surface of the shaft 4 upon which the bore 15 of the pivotal member 14 fits in the manner described above. The width of the portion 7 along the axis of shaft 4 is sufficient to receive the bearing of the spring 25 extending thereabout. The slot 30 in member 14 is of such width that the portion 7 of shaft 4 may enter the slot 30 between the two portions of the main hub of the member 14, thereby to permit the shaft 4 to enter the slot 16 to mount the member 14 on this shaft as above described.

In order to limit the movement of the knob and the member 14 in the clockwise direction and to provide a suitable bearing surface with which the member 14 may substantially rigidly cooperate when the device is in the operating position, the wall of the clamping piece 1 extends toward the left in Figs. 2 and 3 sufficiently to provide the end surface 9 against which the member 14 may abut when it is swung into the upright position as shown in Fig. 2. Consideration of the action of moving the steering wheel when the knob is grasped by the hand will show that the knob may be readily retained in the upright position since the hand will tend to pull the knob outwardly relative to the axis of the wheel to cause the member 14 to bear against the surface 9. A rigid co-action between the device of the invention and the steering wheel thereby is secured while at the same time the knob may turn on the pivoted member 14 for the purposes which have been referred to above.

Although the invention has been described in its preferred form in which the member 14 is removably mounted in the clamping piece 1, within the scope of the invention this pivoted member 14 may be otherwise mounted, for example in the clamping piece 10. The jaws of these pieces which clamp to the rim 27, if desired, may be separately attached to a common member which carries the shaft 4 upon which the member 14 is pivotally supported. Moreover, although the member 14 has been shown in its preferred form with a hollow cavity in which the spring 25 is placed, this member may be solid and of other forms and the spring may be exterior to the pivoted member 14 while providing the bias means for moving the member 14 and the knob carried thereby to the retracted position. Within the scope of the invention also the member 14 may be permanently instead of removably attached in pivotal relation to a clamping means or to one or the other piece thereof. For the reasons which have been set forth the knob preferably is rotatable on the pivoted member 14. This knob, however, within the scope of the invention may be formed integral with or otherwise in fixed relation to the member 14. The knob may be formed in one piece with suitable provision for its rotation on the member 14 or the two parts 22 and 26 thereof may be cemented or otherwise fastened together. The clamping means also may be formed, if desired, for clamping to a spoke of the steering wheel preferably, however, so as to position the pivotal axis of the member 14 parallel to the plane of the wheel as in the embodiment described above. The device of the invention embodying the pivoted member 14 and its knob and bias means also may be constructed with the support for the member 14 integral with or as part of the steering wheel. Other modifications of the device of the invention may be made without departing from the invention. All such modifications are intended to be within the scope of the claims appended hereto.

I claim:

1. In a steering device for attachment to a steering wheel, the combination with a clamp adapted for clamping engagement with a part of the wheel, of a knob adapted to be grasped by the hand, a shaft supported by said clamp with the axis of the shaft generally parallel to the plane of the wheel when said clamp is in clamping engagement with said part of the wheel, a member supported by said shaft for pivotal movement thereof on the axis of said shaft relative to said clamp, said knob being supported by said member outwardly thereof from said shaft whereby said knob is moved to different positions relative to said part of the wheel upon pivotal movement of said member on said axis of said shaft, said member being formed with a cavity therein, said shaft extending into said cavity, and bias means comprising a spring within said cavity extensible and contractible in the direction transversely of said shaft axis and engaging said shaft and engaging said member outwardly toward said knob from said shaft for effecting pivotal movement of said member and said knob supported thereby on said shaft in a given direction with respect to said part of the wheel.

2. In a steering device for attachment to a steering wheel the combination with means for attaching the device to the wheel, of a knob adapted to be grasped by the hand, a shaft supported by said attaching means with the axis of the saft generally parallel to the plane of the wheel when said device is attached to the wheel, and a member supported by said shaft for pivotal movement thereof about the axis of the shaft relative to said attaching means, said knob being supported by said member outwardly thereon from said shaft, said shaft and said member being formed with respect to each other for removal of said member from said shaft transversely of the axis of said shaft when said member is pivotally moved to a given position relative to said shaft and for maintaining said member in pivotal relation to said shaft in other positions to which said member is moved about said shaft.

3. In a steering device for attachment to a steering wheel, the combination with means for attaching the device to the wheel, of a knob adapted to be grasped by the hand, a shaft supported by said attaching means with the axis of the shaft generally parallel to the plane of the wheel when said device is attached to the wheel, a member supported by said shaft for pivotal movement thereon relative to said attaching means, said knob being supported by said member outwardly thereon from said shaft, said member being formed with an elongated cavity therein extending transversely of said shaft, said shaft extending into said cavity adjacent one end of said cavity, and a helical spring extending within said cavity having an end engaging said member adjacent the end of said cavity outwardly from said shaft and extending circumferentially about said shaft and engaging said shaft adjacent the other end of said spring to bias said member pivotally to move on said shaft in a given direction so as to move said knob in a given direction with respect to said wheel.

4. In a steering device adapted to be attached to a steering wheel, the combination as defined in claim 2 which comprises means carried by said attaching means and adapted to engage said member when said device is attached to the wheel to limit the pivotal movement thereof toward and so as not to reach said given position, thereby to prevent removal of said member from said shaft.

5. In a steering device for attachment to a steering wheel, the combination with means for attaching the device to the wheel, of a member supported by said attaching means for pivotal movement thereof with respect to said attaching means, a part adapted to be grasped by the hand and carried by said member outwardly thereof with respect to the pivotal axis of said member, said member being formed with walls extending about a cavity therein, and bias means within said cavity operatively connected to said attaching means and to said member and adapted to be extensible and contractible upon pivotal movement of said member respectively in a given direction and in the reverse direction of said movement thereof for biasing said member to move in said reverse direction.

6. In a steering device adapted to be attached to a steering wheel, the combination as defined in claim 5, said bias means comprising a helical spring supported within said cavity and connected at its ends respectively to said member and to said attaching means.

7. In a steering device adapted to be attached to a steering wheel, the combination as defined in claim 5 in which said part carried by said pivotally supported member and adapted to be grasped by the hand is formed as a knob, said bias means comprising a helical spring connected at its ends respectively to said member and to said attaching means, said knob being formed with a portion thereof covering the outer end of said member and said cavity, said portion being removable from said knob to provide access to said cavity and said spring.

8. In a steering device for attachment to a steering wheel the combination as defined in claim 5 which comprises means carried by said attaching means and adapted to engage said member to limit the pivotal movement thereof effected against the action of said bias means to make said member substantially rigidly cooperate with said attaching means when said part carried by said pivoted member is grasped by the hand for steering operation.

9. In a steering device for attachment to a steering wheel, the combination with means for attaching the device to the wheel, of a member supported by said attaching means for pivotal movement thereof with respect to said attaching means, a part adapted to be grasped by the hand and carried by said member outwardly thereof with respect to the pivotal axis of said member, and bias means operatively connected to said attaching means and to said member for biasing said member pivotally to move toward a retracted position when said member is moved therefrom against the bias of said bias means, said member being formed with walls extending about a cavity therein and about said bias means substantially to enclose said bias means within said cavity.

SYDNEY GARFIELD.

REFERENCES CITED

The following references are of record in the file of this patent:

UNITED STATES PATENTS

| Number | Name | Date |
|---|---|---|
| 1,189,339 | Bakke | July 4, 1916 |
| 1,595,695 | Thomas | Aug. 10, 1926 |
| 1,926,391 | Krieg | Sept. 12, 1933 |
| 1,958,165 | Le Compte | May 8, 1934 |
| 2,123,811 | Sinko | July 12, 1938 |
| 2,139,549 | Hansen | Dec. 6, 1938 |

FOREIGN PATENTS

| Number | Country | Date |
|---|---|---|
| 753,244 | France | Oct. 11, 1933 |
| 825,212 | France | Feb. 25, 1938 |